E. G. CATE.
Method of Making Footed Glass Bowls.
No. 144,061. Patented Oct. 28, 1873.
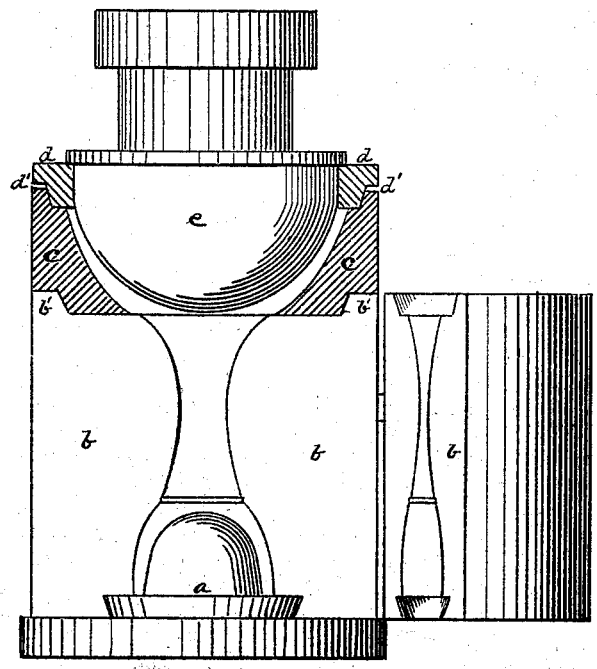

UNITED STATES PATENT OFFICE.

ELIJAH G. CATE, OF WHEELING, WEST VIRGINIA.

IMPROVEMENT IN THE METHODS OF MAKING FOOTED GLASS BOWLS.

Specification forming part of Letters Patent No. 144,061, dated October 28, 1873; application filed May 17, 1873.

*To all whom it may concern:*

Be it known that I, ELIJAH G. CATE, of Wheeling, in the county of Ohio and State of West Virginia, have invented a new and useful Improvement in the Manufacture of Glassware; and I do hereby declare the following to be a full, clear, and exact description thereof, reference being had to the accompanying drawing forming a part of this specification, which is a view of a mold for forming footed glass bowls, the same being partly in section and partly in side elevation.

Heretofore footed glass bowls have been made in several different steps or operations. First, it was necessary to press the bowl and the foot separately, after which they were joined by welding them together with a piece of molten glass, the whole operation constituting three different steps. In addition to this, the article which is thus made is very frail, breaking at the point where the two parts are welded at a slight blow. The loss in these articles from breakage is very large.

My invention consists in forming the whole article at one operation, so as to economize time and labor, and do away with the necessity of a joint, and thereby to produce a much stronger article.

To enable others skilled in the art to make use of my invention, I will describe it more fully.

I make use of a mold composed of four parts: First, the base $a$ for forming the bowl-shaped foot, in connection with the two-part mold $b$, which also forms the solid stem; third, a solid mold, $c$, for forming the bowl; and, fourth, a ring, $d$, through which the plunger passes, and which forms the upper edge of the bowl. The two-part mold $b$ is placed on the base $a$, and closed in the usual way; and the solid mold is placed on its upper end, to which it is secured by the joint formed by the flange $b'$, which extends up in the recess which runs around the lower edge of the solid mold $c$. The ring $d$ is placed above the solid mold, and is secured to it by a similar joint, $d'$. The inner edge of the ring $d$ extends over the cavity of the solid mold $c$ a short distance, for the purpose of forming the upper edge of the bowl. The molten glass is placed in the cavity of the mold thus formed, and is pressed into shape so as to form the article by one stroke of the plunger $e$. After the article has been thus pressed it is removed from the mold and finished in the usual way, and receives its exact shape.

The operation of finishing is as follows: The article is seized by an instrument called a "snap" and held in the "glory"-hole of the furnace, where it receives a fire-polish—that is, the slight external roughness received from the mold is melted or smoothed down by the fire. This heating melts the article out of shape, so that it is taken to a "chair," and, by means of a flat paddle, is rolled into shape. Sometimes the bowl is left deep, and again it is made of various degrees of shallowness, at the option of the manufacturer. The bowl-part, when a salver is desired, is flattened out by the paddle. After this the articles are annealed in the usual way.

In the drawing the mold $b$ is represented as opened, so as to show the shape of the cavity therein. This mold may be formed of any number of pieces or parts desired.

The economy of this method of forming these articles over the old way is evident, and need not be enlarged upon, while the article made is superior to that produced by the old method in the respects described.

I am aware that ordinary cup-foot drinking-goblets have been made at one operation, and therefore do not claim such.

What I claim as my invention, and desire to secure by Letters Patent, is—

The hereinbefore-described method of forming footed glass bowls entire, in a suitable mold, by one stroke of the plunger.

In testimony whereof I, the said ELIJAH G. CATE, have hereunto set my hand.

ELIJAH G. CATE.

Witnesses:
FREDERICK STANDISH,
T. B. KERR.